Aug. 12, 1941.    O. T. PIEPER    2,252,029
SEALED MOTION TRANSMITTING DEVICE
Filed July 5, 1939    2 Sheets-Sheet 1
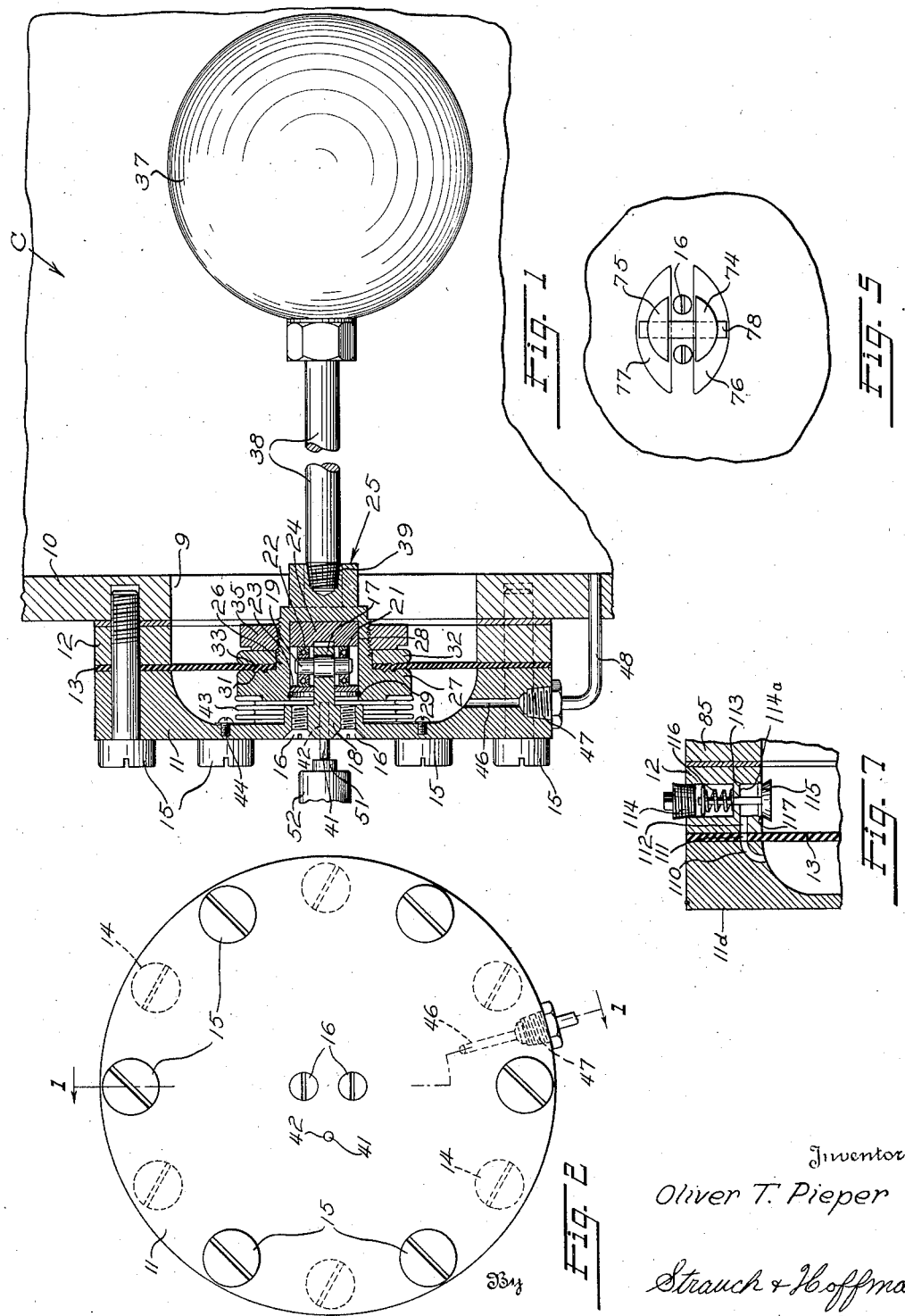
Inventor
Oliver T. Pieper
By Strauch & Hoffman
Attorneys Aug. 12, 1941.   O. T. PIEPER   2,252,029
SEALED MOTION TRANSMITTING DEVICE
Filed July 5, 1939   2 Sheets-Sheet 2

Inventor
Oliver T. Pieper
By Strauch & Hoffman
Attorneys

Patented Aug. 12, 1941

2,252,029

UNITED STATES PATENT OFFICE 2,252,029

SEALED MOTION TRANSMITTING DEVICE

Oliver T. Pieper, Wilmington, Del.

Application July 5, 1939, Serial No. 282,868

13 Claims. (Cl. 286—29)

The present invention relates to devices for transmitting a limited amount of motion originating at one side of a wall to the other, and it is more particularly concerned with devices of this character which embody a lever and a flexible diaphragm for sealing the joint between the lever and the opening in the wall.

Although devices of this general character have been heretofore proposed, they have not proved altogether satisfactory because they have relatively slidable or rotatable parts which are exposed to the interior of the chamber or the like and consequently become corroded or else a sticky adherent film develops between them and sets up so much resistance as to destroy the sensitiveness of the device. The prior devices are also open to the objection that the diaphragm, which must be sufficiently light and flexible to allow the lever to freely respond to forces exerted upon it, is subjected to the full pressure existing within the vessel or chamber with which it is associated, and is frequently ruptured, even under fairly low pressure conditions, and where high pressures are involved, it cannot be used at all. In certain of the prior devices the lever is journaled at a point remote from the diaphragm with the result that the latter manifests considerable resistance to rocking movement of the lever; seriously impairs the sensitiveness of the device; and materially shortens the useful life of the diaphragm.

It is accordingly the major object of my invention to provide novel motion transmitting devices which will efficiently transmit motions originating on one side of a wall to the other without fluid leakage, which are efficient and sensitive, and are so designed as to retain their efficiency and sensitiveness throughout their life, are of rugged and simple construction, and yet which may be produced at low cost.

Another important object is to provide novel motion transmitting devices which embody a lever and a diaphragm and means for journalling the lever for rocking movement about an axis located exactly between the planes of the diaphragm, whereby the latter exerts minimum resistance to rocking movement of the lever and has a long useful life in service.

A further object is to provide motion transmitting devices embodying light, flexible diaphragms, so as to exert minimum resistance to lever movements, and yet which are so designed that the pressures on the two sides of the diaphragm may be exactly equalized and stresses in the latter are minimized and they may be effectively used in high pressure and high vacuum installations without rupturing or otherwise damaging the diaphragm.

A further object is to provide motion transmitting devices embodying the novel features above pointed out, and also further more detailed but yet important refinements and improvements which will become apparent as the specification proceeds in connection with the annexed drawings, and from the appended claims.

In the drawings:

Figure 1 is a longitudinal sectional view through a motion transmitting device embodying my invention, and the section has been taken looking down upon the construction substantially along the line 1—1 of Figure 2;

Figure 2 is an end elevational view of the device shown in Figure 1, as it appears when viewed from the left-hand side of that figure;

Figure 5 is a fragmental end elevational view of the device shown in Figure 4 as it appears from the left-hand side of that figure;

Figure 7 is a fragmental view somewhat similar to Figure 6 but shows a further modification of my invention.

Figure 3:
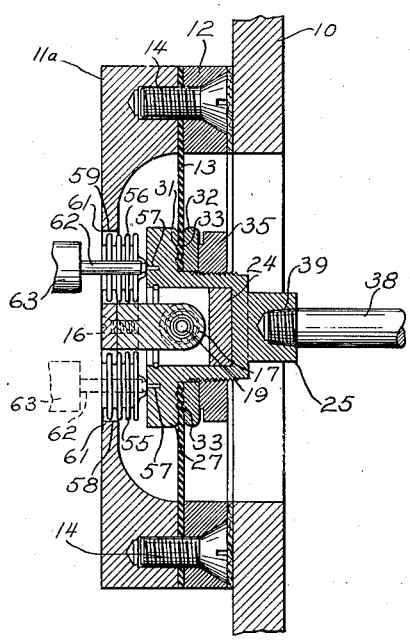
Figure 3 is a longitudinal sectional view through a modified form of motion transmitting device also forming part of the invention, and this section has been taken approximately 90 degrees from the position of the section for Figure 1.

With continued reference to the drawings, wherein like reference characters have been employed to indicate like parts throughout the several views thereof, and referring particularly to Figures 1 and 2, I have illustrated my device as being mounted over an opening 9 in the wall 10 of a chamber C, in which the particular motion to be transmitted originates. I have chosen to illustrate a concrete example of the invention of my device as being applied to a float control device, but it is to be understood that my novel motion transmitting device may be used in any desirable situation wherever a motion originating on one side of a wall is to be transmitted to the other side of the wall without leakage, friction or wear. For instance, instead of having the force originate on one side of the wall in a float mechanism, it may originate from the flow of air, steam or other gas or liquid in a tube or pipe, and it may also originate from some mechanical or electrical device creating motion, such as a fan, propeller or piston.

My device comprises a cup-like supporting member or mounting block 11 and a ring 12, which sealingly clamp between them a flexible diaphragm 13, which may be of any desired construction, such as rubber re-enforced by fabric; sheet metal; and/or synthetic rubber; or any other suitable material. Members 11 and 12 are tightly secured together by means of a plurality of countersink headed screws 14, which are threaded into member 11, and the entire assembly is secured to wall 10 of chamber C by means of a plurality of screws 15, which pass through aligned openings in members 11 and 12 and diaphragm 13. A gasket may be used between the assembly and wall 10 to provide a fluid-tight joint.

Secured to the bottom of member 11 by means of a pair of screws 16 is a bearing support or standard 17, having a base portion 18. Rigidly secured in member 17, as by means of a force fit, is a shaft 19, and secured to each end thereof is the inner race of a pair of anti-friction bearings 21 and 22. The outer bearing races are secured in a large recess 23 in a cylindrical member 24.

Member 24 is carried in the cylindrical portion 26 of a member 25, which constitutes a part of the lever assembly and it is provided with a flange 27. Member 24 is disposed in a bore 28 in member 25, and is held therein by means of a resilient split ring 29, which is sprung into a groove in the wall.

Flange 27 is provided with a clamping face having a plurality of circular depressions 31 therein. A ring member 32 having a plurality of circular ridges 33 matching with the grooves in flange 27 is slipped over the end of member 25 and is forced into tight engagement with the diaphragm by means of a nut 35 threaded on the outside of member 25.

By providing the novel construction just described, member 25 is pivoted for free rocking movement in anti-friction bearings upon the supporting member; the diaphragm is tightly clamped between mating parts on the lever assembly; and the diaphragm is so located with respect to the axis of rocking movement of the lever that it exerts a minimum resistance to lever movement and will have a long useful life in service.

As previously pointed out, the novel motion transmitting devices of the invention may be employed for transmitting any desired force, however it may originate, from one side of a wall to the other. In the present instance, I have disclosed a float 37 having an arm portion 38 threaded into member 25 at 39 as producing the force in response to changes in the liquid level in chamber C.

Up and down movements of float 37 are therefore reflected as rocking movements of the rear face of flange 27, and this force, so transmitted, may be utilized in any desired manner to open and close a valve, make and break an electric circuit, operate a signal or perform any other desired operation. In the present instance, I have illustrated it as operating a pin 41 extending through an opening 42 in member 11, and cooperating in contacting relationship to the rear face of flange 27.

If desired, especially in low pressure and vacuum or atmospheric pressure installations, the construction thus far described may be used with perfect success.

However, in Figures 1 and 2 I have illustrated the construction as being adapted for both high pressure and high vacuum operation, and therefore have provided a resilient metallic bellows 43 surrounding the standard and the operating pin 41 and it is secured to the base of member 11 by a plurality of screws 44. The other end of member 43 is secured to the rear face of flange 27 in any suitable manner, as for instance by welding, soldering or the like. Leading into one wall of member 11 is a passage 46 terminating in its outer end in a tapered thread 47 adapting it for connection to a pipe line 48. Pipe line 48 is preferably tapped into the wall of chamber C at a point above the liquid level, so that the vapor pressure or the air pressure above the liquid may find its way to pipe line 48 and passage 46 to the annular sealed space behind the diaphragm. By designing the parts in this manner, it is observed that the rear face of the diaphragm is subjected to exactly the same pressure as the front face, thereby eliminating all stresses therein, no matter to what pressure the chamber is subjected. Also, the working parts are fully protected against liquid, because line 48 is introduced into the chamber above the liquid level, and metallic bellows 43 keep the vapor out of the anti-friction bearings.

Bearings 21 and 22 may be lubricated in any suitable manner, or if desired they may be of the permanently sealed and lubricated type, which are now well known in the art.

Lever arm 38 may be made of any desired length to produce the desired movement of plunger 41. Since the parts move very freely in response to up and down movement of float 37, arm 38 may be made comparatively short, to produce larger deflections of plunger 41, in response to movements of arm 38. In most instances, however, it is only necessary to deflect plunger 41 a slight distance to actuate the control mechanism because the latter usually requires a deflection of less than one one-hundredth of an inch to effect actuation of a valve, a switch or the like. In Figure 1, I have illustrated the plunger 41 as cooperating with an actuating pin 51, slidably mounted in a casing 52.

In the construction illustrated in Figure 3, many of the parts are the same as those illustrated in Figures 1 and 2 and therefore the same reference characters will be employed to designate like parts, and no further description will be given of them.

In this form of the invention, flange 27 terminates adjacent the bottom of the cup as before, but it cooperates with a pair of bellows members 55 and 56, which are preferably of exactly the same size and resilience. Each bellows member is secured to flange 27 by means of a screw 57 and in order to provide a fluid tight joint the heads of the screws may be soldered or otherwise sealingly secured to the bellows.

Bellows 55 and 56 extend through openings 58 and 59, respectively, in the bottom of member 11a and their open ends are secured to the countersinks in member 11a at 61.

A sealed space is accordingly provided between the bottom of member 11a and the diaphragm, and as the construction illustrated is designed for use with chambers containing pressures in excess of atmospheric pressure or vacuum, bellows 55 and 56 are secured to flange 27 by means of screws 57 as previously described, in order to keep the super-atmospheric pressure admitted through passage 46 from collapsing the tubes and disengaging them from the flange 27. It is to be understood, however, that if the device is used with a chamber having sub-atmospheric pressures, screws 57 may be omitted, because the sub-atmospheric pressure within the sealed space maintains the bellows fully extended into contact with the face of flange 27.

If it is desired to impart a force or "push" to the actuating pin in response to lifting movement of the float, the parts may be arranged as illustrated in Figure 3, with an actuating pin 62 carried by a supporting block 63, located within the upper bellows 56, and in contact with the head of screw 57.

Therefore, when the liquid level rises in chamber C, float 37 will rock about shaft 19 as an axis in a counter-clockwise direction and cause flange 27 to undergo a similar rocking movement and compress bellows 56 and urge pin 62 to the left. The parts are illustrated in their rocked positions by dotted lines in Figure 3.

If, on the other hand, it is desired to impart an actuating force to plunger 62 when the float lowers and rocks in a clockwise direction about shaft 19, plunger 62 may be disposed in the lower bellows 55 as indicated in broken lines in Figure 3.

Figure 4:
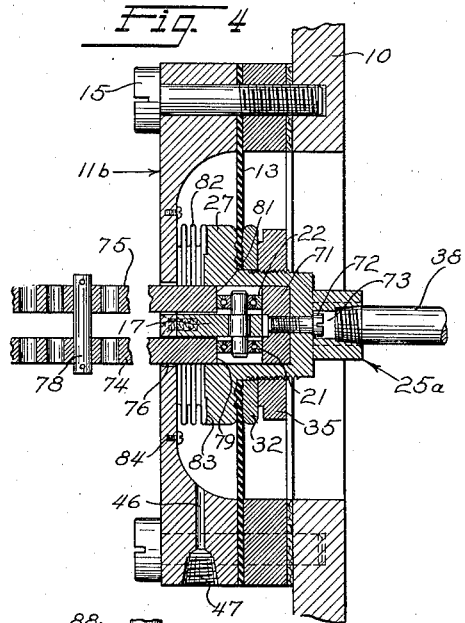
Figure 4 is a view somewhat similar to Figure 1, but illustrates a further modified form of device also forming part of the invention.

In the form of construction illustrated in Figures 4 and 5, the parts are modified so that a rigid extension of the lever extends completely through member 11b, so that it may directly actuate a linkage or other mechanism connected to the liquid or other control apparatus.

Referring to Figures 4 and 5, member 25a is of slightly modified construction. Lever 38 is secured therein in the same manner as before, but a lever member 71 is disposed in the opening 28 of member 25a and is secured therein by means of a screw 72 seating in a recess 73 in member 25a. A member 71 is bifurcated to provide a pair of integrally formed levers 74 and 75 which extend either side of standard 17 and projects through openings 76 and 77, respectively, provided in the base of member 11b. Levers 74 and 75 of member 71 are also provided with a plurality of openings into which a pin 78 is adapted to be selectively inserted, to effect the desired mechanical ratio between the float movements and the movements of the control apparatus.

Bearings 21 and 22 are supported in bores 79 and 81, respectively, located in levers 74 and 75, and they function in the same manner as the previously described forms of the invention to pivotally support the levers on the base with a minimum of friction.

In order to provide a sealed chamber behind the diaphragm, a metal bellows 82 is disposed between flange 27 and the base. It is secured to the flange at 83, and to the base by a plurality of screws 84.

Figure 6:
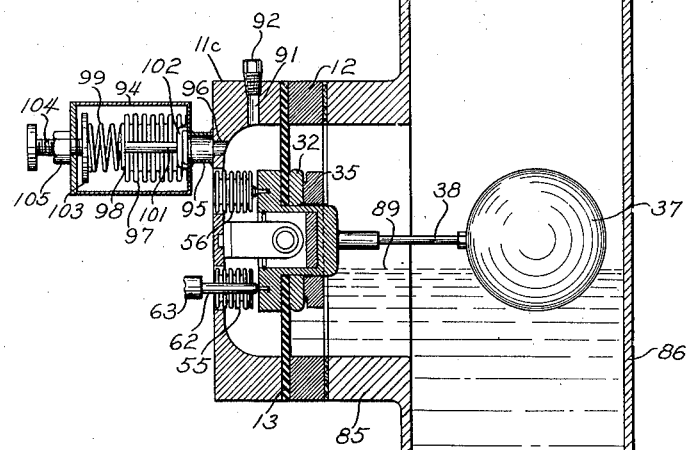
Figure 6 is a vertical sectional view through the device of Figure 3, illustrated as having associated with it a pressure equalizing apparatus also forming a part of my invention.

In some installations, due to the corrosive or highly volatile nature of the liquids being handled in the chamber, it may not be feasible to bleed pressure directly from the space above the liquid to the space behind the diaphragm, and in this instance I employ an independent back pressure producing unit embodying an expansible chamber and an independent supply of fluid, preferably liquid, and in Figure 6 I have illustrated a system of this character.

In Figure 6 I have illustrated somewhat diagrammatically the motion transmitting apparatus of Figure 3 as having an independent back pressure producing system associated with it. In this figure I have also illustrated a modified manner in which the apparatus may be associated with the chamber. Base member 11c and ring 12 are clamped to a circular boss 85 formed on a float chamber 86, which houses float 37 and float arm 38. A pipe 87 is connected to the main chamber below the normal level of the liquid, and a pipe 88 is connected to the main chamber above the liquid level, with the result that the liquid in chamber 86 seeks the same level as the liquid in the main chamber, and it is indicated at 89. Plunger 62 is associated with bellows 55 in the manner described in connection with Figure 3, and is accordingly actuated in response to movements of float 37.

The upper portion of member 11c is provided with a passage 91 closed by a removable plug 92, so that the space behind the diaphragm may be filled with any suitable fluid or liquid, and preferably one that does not undergo any considerable expansion or contraction in response to temperature changes, and one that will not exert any corrosive action upon the various working parts. For instance, lubricating oil constitutes a good liquid to employ and it possesses the further advantage of constantly bathing bearings 21 and 22 with lubricant.

Located at any convenient point adjacent the apparatus is a chamber 94, which is connected to the space behind the diaphragm by means of a conduit 95 and a passage 96 in member 11c. Mounted over the outlet in chamber 94 is the open end of a metallic bellows 97 having a closed end 98 which is acted upon by a compression spring 99. A stop member 101 is located within bellows 97 and is provided with a bifurcated end 102, so that the bellows can only be collapsed to a predetermined degree when the bifurcated end of the stop will engage the end of chamber 94.

Spring 99 reacts against a plate 103, which in turn is backed up by a screw 104 threaded into a boss 105 formed on the head of a chamber.

Assuming that the system has been completely filled with liquid by way of passage 91, and plug 92 has been replaced, and it is desired to exactly balance the pressure within chamber 86 and the main chamber, screw 104 is turned up to exert a loading upon spring 99 sufficient to establish the proper back pressure. To this end, a pressure gauge is preferably inserted somewhere in the line in communication with the fluid contained in the back pressure system. Preferably it is located adjacent the gauge which indicates the pressure in chamber 86, so that the two readings may be readily compared and the back pressure quickly adjusted to the proper value. If desired, the pressure from the main chamber may be applied directly to bellows 97 for building up the proper back pressure in the system and spring 99 and screw 104 omitted, it only being necessary to provide a bellows with a head having an area equal to the annular portion of diaphragm 13 exposed to the back pressure, so that the two pressures will be substantially balanced and will avoid subjecting the diaphragm to stresses in operation.

In Figure 7, I have shown a motion transmitting mechanism particularly adapted for vacuum installation and it embodies a valve for automatically cutting off fluid communication between the front and rear sides of the diaphragm when the unit is taken out of service for cleaning and the like.

The motion transmitting mechanism of Figure 3 has been chosen by way of illustration, although the device about to be described may be incorporated in any of the other forms of my invention. Member 11d is provided with a passage 110 which is in fluid communication with an aperture 111 in diaphragm 13; a port 112; and a bore 113 in ring 12. Bore 113 is closed by a removable plug 114. An apertured boss 114a is formed in bore 113 and slidably supports a valve 115, and forms an abutment for a valve spring 116. The latter is connected to the end of the valve stem and normally urges valve 115 toward its seat 117, so as to close off communication between the two sides of the diaphragm.

Assuming that the device is placed in operation with a vacuum in the float chamber, valve 115 will open and allow part of the air in the sealed chamber behind the diaphragm to be exhausted through passage 110; aperture 111; port 112; and bore 113, thereby equalizing the pressures on the opposite sides of the diaphragm and relieving it of stress.

When the device is taken out of service, for instance for cleaning the float chamber with a caustic soda solution, the vacuum is broken and spring 116 immediately closes valve 115, thereby cutting off communication between the float chamber and the sealed space behind the diaphragm, and insuring that no caustic soda or any other liquid will find its way behind the diaphragm. When the device is again placed in service the vacuum will again open valve 115 and establish communication as previously described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a motion transmitting device adapted for use with a chamber partially filled with a liquid at a pressure which is higher or lower than atmospheric, a lever assembly projecting into said chamber adjacent the level of the liquid and sealed against fluid leakage by a diaphragm, means providing a sealed space between said diaphragm and the atmosphere; means for transmitting motion from said lever assembly through said sealed space to the atmosphere and including means for preventing fluid communication between the latter and said sealed space; conduit means communicating with said chamber above the liquid level therein and with said sealed space, for maintaining in the latter a liquid-free fluid pressure equal to the pressure in said chamber, so as to equalize the pressures on the opposite sides of said diaphragm.

2. In a motion transmitting device, a member adapted to form a closure for an opening in a chamber, a substantially centrally located support carried by said member and projecting from the latter in a direction parallel to the axis of said opening, a lever projecting through said opening and having a cylindrical recess disposed substantially parallel to the axis of said opening, bearing means in said recess, a trunnion carried by said support and extending into said bearing means, and sealing means, disposed substantially in a plane containing the axis of said trunnion, for preventing fluid leakage between said lever and said member.

3. In a motion transmitting device, adapted for use with a chamber which may be at a pressure which is higher or lower than atmospheric, a lever mounted for rocking movement transversely to its length and projecting into said chamber, a flexible diaphragm associated with said lever for preventing fluid flow between said chamber and the atmosphere, means providing a sealed space between said diaphragm and the atmosphere, means for transmitting motion from said lever to the atmosphere and including means for preventing fluid flow between said sealed space and the atmosphere, and a separate fluid system communicating with said sealed space for subjecting said diaphragm to a pressure substantially equal to the pressure in said chamber, comprising an expansible vessel communicating with said sealed space and having spring means constantly tending to reduce the volume of said vessel, and means for adjustably varying the pressure exerted by said spring means.

4. In a motion transmitting device, a cup-shaped support adapted to be fitted over an opening in a chamber containing a pressure above or below atmospheric pressure; a lever assembly projecting from said chamber into said cup; a flexible member sealingly associated with said lever and the rim of said cup for providing a fluid-tight space within said cup; means associated with said lever assembly for transmitting motion through the bottom of said cup and including means for preventing fluid communication between the atmosphere and said space within the cup, and pressure means for establishing a fluid pressure within said fluid space substantially equal to the pressure in said chamber, for equalizing the pressures on the opposite sides of said flexible member.

5. The device defined in claim 4, wherein said pressure means comprises an expansible vessel in fluid communication with said fluid space; resilient means constantly tending to reduce the volume of said vessel; and means for adjustably varying the load on said resilient means, for adjusting the pressure opposing the pressure in said chamber.

6. In a motion transmitting device, a cup-shaped member having a central support projecting from the bottom thereof, a diaphragm sealingly clamped to the rim of said cup and terminating short of said support to provide a central opening; a lever assembly extending through the opening in said diaphragm and sealingly secured to the margin thereof; means for pivotally mounting said lever on said support; flexible sealing means surrounding the base of said support and secured at one end to said lever assembly and at the other end to the bottom of said cup, to provide an annular sealed chamber within said cup; and an operating element extending through an opening in the bottom of said cup and cooperating through said sealing means in contacting relationship with said lever assembly.

7. In a motion transmitting device, a cup-shaped member having a central support projecting from the bottom thereof; a diaphragm sealingly clamped to the rim of said cup and terminating short of said support to provide a central opening; a lever assembly extending through the opening in said diaphragm and sealingly secured to the margin thereof; means for pivotally mounting said lever on said support; a flexible metallic bellows surrounding the base of said support and secured at one end to said lever assembly and at the other end to the bottom of said cup, to provide an annular sealed chamber within said cup; and an operating element extending through an opening in the bottom of said cup and through said bellows, and cooperating in contacting relationship with said lever assembly.

8. In a motion transmitting device a cup-shaped member having a central support projecting from the bottom thereof, a diaphragm sealingly clamped to the rim of said cup and terminating short of said support to provide a central opening; a lever assembly extending through the opening in said diaphragm and sealingly secured to the margin thereof; means for pivotally mounting said lever on said support; said cup-shaped member having a pair of openings in the bottom thereof offset from said support, a flexible sealing element projecting through each of said openings and cooperating in contacting relationship with said lever assembly, and an operating pin adapted to be projected through either of said openings and derive motion from said lever assembly.

9. In a motion transmitting device, a cup-shaped member having a central support projecting from the bottom thereof; a diaphragm sealingly clamped to the rim of said cup and terminating short of said support to provide a central opening; a lever assembly extending through the opening in said diaphragm and sealingly secured to the margin thereof; means for pivotally mounting said lever on said support; said cup having an offset opening in its bottom; and flexible sealing means surrounding the base of said support and secured at one end to said lever assembly and at the other end to the bottom of said cup around the margin of said opening, to provide an annular sealed chamber within said cup, said lever assembly having a rigid portion extending through said sealing means and through the offset opening in the bottom of said cup-like member.

10. In a motion transmitting device, a supporting member having a generally circular portion terminating at its periphery in an axially directed flange; a central standard provided on the circular portion of said member; a lever pivoted on said standard and extending through a slot provided in said circular portion adjacent said standard; a flexible diaphragm sealingly secured to said flange and terminating short of the center of said member to provide an opening around said standard, a second lever extending through the opening in said diaphragm and having a clamping face disposed on one side of the latter; a clamping ring disposed on the other side of said diaphragm and clamping the latter against the clamping face of said second lever; and means for securing said first and second levers together in rigid, force-transmitting relationship.

11. The device defined in claim 10, wherein said first lever is forked to provide a pair of arms projecting through a pair of openings in the circular portion of said supporting member, one being located on each side of said standard.

12. In a motion transmitting device, a chamber in which sub-atmospheric pressures are adapted to be developed; a lever passing through an opening in said chamber and sealed against fluid leakage by a flexible diaphragm; means providing a sealed space behind said diaphragm, conduit means connecting said sealed space and said chamber; and valve means for preventing fluid flow from said chamber to said sealed space.

13. The device described in claim 12, wherein said valve means comprises a valve in said conduit means normally urged toward closed position and so disposed as to be automatically opened by a preponderance of pressure in said sealed space over the pressure in said chamber.

OLIVER T. PIEPER.